United States Patent [19]
Glassman

[11] 3,766,667
[45] Oct. 23, 1973

[54] EDUCATIONAL ARITHMETIC MANIPULATIVE TOY

[76] Inventor: Stanley H. Glassman, 41 Harvest Ln., Commack, N.Y.

[22] Filed: Jan. 11, 1971

[21] Appl. No.: 105,363

[52] U.S. Cl............................ 35/31 G, 35/70, 46/26
[51] Int. Cl....................... G09b 19/02, A63h 33/12
[58] Field of Search................ 35/31 R, 31 D, 31 G, 35/69, 70; 46/26

[56] References Cited
UNITED STATES PATENTS

| | | | |
|---|---|---|---|
| 1,428,206 | 9/1922 | Benton.................................... | 35/72 |
| 3,094,792 | 6/1963 | Morgan et al........................ | 35/31 R |
| 3,229,388 | 1/1966 | Smith..................................... | 35/70 |

FOREIGN PATENTS OR APPLICATIONS

| | | | |
|---|---|---|---|
| 523,660 | 4/1921 | France................................... | 46/26 |

Primary Examiner—Wm. H. Grieb
Attorney—Alfred Musumeci

[57] ABSTRACT

An educational toy useful as an aid in teaching arithmetic concepts comprises a set of number blocks with separate pegs adapted to extend through apertures in the blocks for stacking the blocks in multiple levels. Each of the blocks is formed of a length and with a number of apertures determined by a designated numerical value for the block. When stacked in appropriate levels with the pegs extending through the apertures, the blocks and pegs cooperate to provide a physical and visual representation of numerical or arithmetic concepts. A particular feature of the invention is the length of the pegs relative to the height of the blocks which permits stacking of the blocks to an optimum number of levels.

4 Claims, 9 Drawing Figures

Patented Oct. 23, 1973
3,766,667
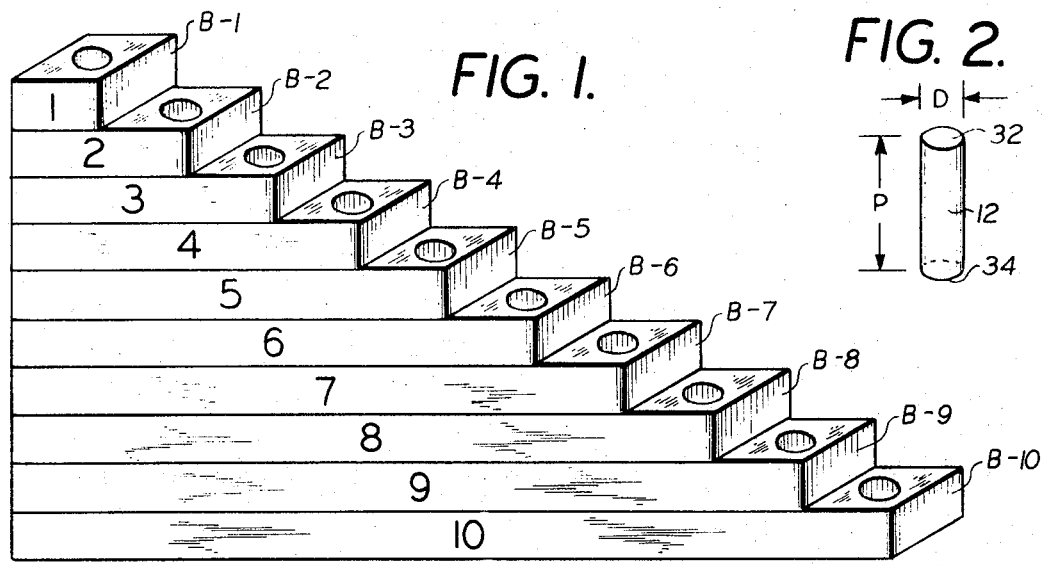
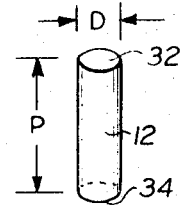
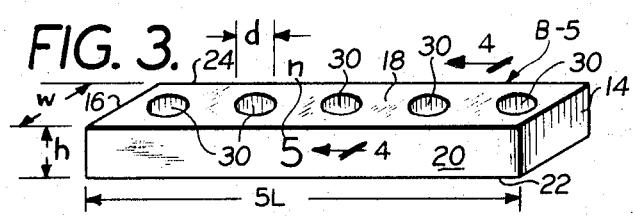
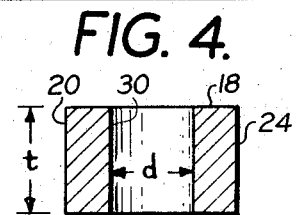
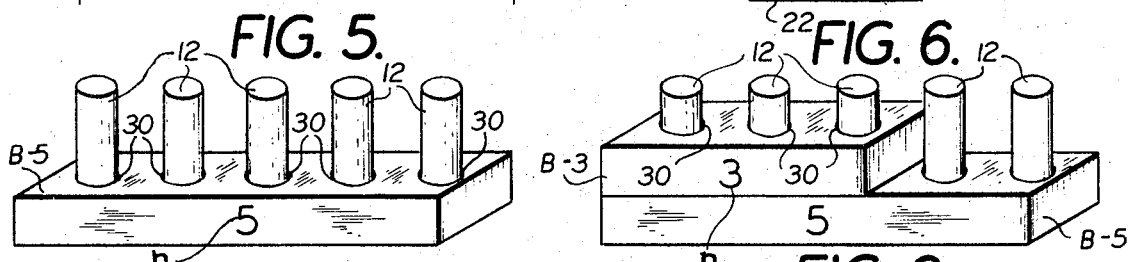
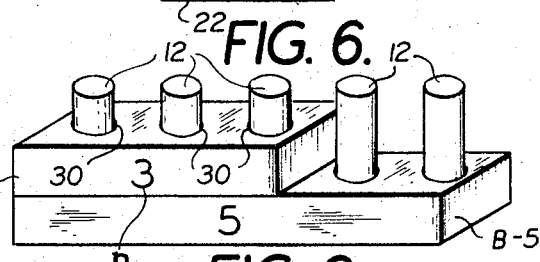
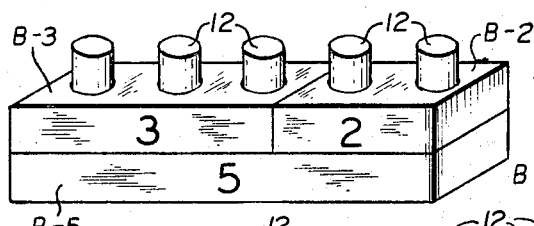
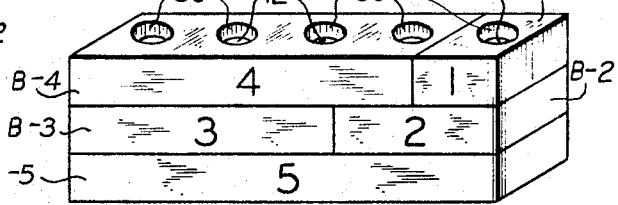
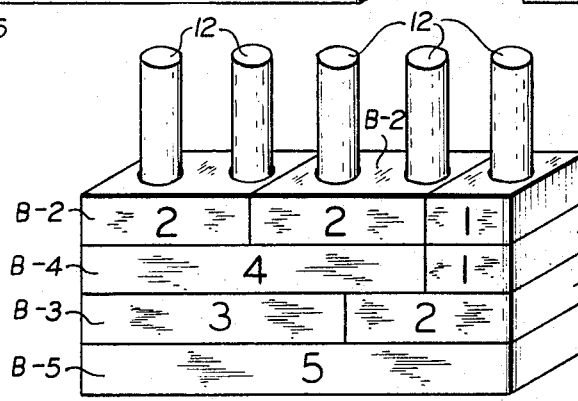
INVENTOR
STANLEY H. GLASSMAN
BY
*Hubbell, Cohen & Stiefel*
ATTORNEYS.

EDUCATIONAL ARITHMETIC MANIPULATIVE TOY

BACKGROUND OF THE INVENTION

1. Field of the Invention

The present invention relates to educational toys and more particularly to a manipulative aid for teaching arithmetic concepts. The invention is especially appropriate for use with young children, and may be advantageously effective in assisting visually or physically handicapped children. Also, the invention will be helpful in connection with teaching processes which involve retarded children or children who may be considered slow learners.

The invention is specifically concerned with numerical relationships and provides a visual manipulative device to assist in the learning and reinforcement of numbers concepts and arithmetic processes.

2. Discussion of the Prior Art

Teaching aids of the type to which the present invention relates should provide visual and physical representation of concepts to be taught in a vivid and effective manner. Generally, such devices should also be entertaining and amusing in their use and manipulation in order to attract and hold the interest of a child, thereby to inspire or motivate the child to pursue the learning process.

In this connection, simplicity of structure and operation should be effectively combined with graphicness in order for the device to be most advantageously effective. In many prior art devices, cumbersomeness and complexity make manipulation difficult thereby not only discouraging a child, but also failing to appropriately convey an effective representation of the concepts to be taught.

Structural simplicity offers an additional advantage in such devices in that the manufacturing cost, and consequently the selling price, may be gainfully minimized. Since such items are usually sold in either a general consumer market or to schools or other similar institutions, the price of the item will be of great significance in the commercial success and in the practical acceptability thereof.

Accordingly, it will be seen that provision of an entertaining manipulative teaching aid which is simply structured to graphically convey arithmetic concepts and which may be successfully produced at a relatively low cost will entail a desirable forward step in the art of educational toys.

SUMMARY OF THE INVENTION

Briefly, the present invention may be described as a manipulative arithmetic device comprising a plurality of blocks each having a numerical value designation, a length dimension determined by said numerical value designation and a width dimension extending transversely of said length dimension. A number of apertures representative of said numerical value designation extend through said blocks across said width dimension and are equivalently spaced therealong, with the number of said apertures being determined by said numerical value designation. A plurality of pegs of a generally equivalent length adapted to be removably placed within said representative apertures cooperate with said blocks in adapting the device for formation of a stacked arrangement of said blocks in a plurality of block levels with said pegs comprising a length enabling them to extend through said representative apertures with a continuous portion of said peg length extending between stacked block levels. By manipulating the blocks and pegs of the present invention in this manner there may be provided physical and visual representations of various arithmetic and numerical concepts.

BRIEF DESCRIPTION OF THE DRAWINGS

The present invention will be better understood by reference to the following detailed description of a preferred embodiment thereof taken in connection with the accompanying drawings wherein:

FIG. 1 is a perspective view showing 10 different exemplary blocks of the type which may be utilized in the present invention, with the blocks arranged in a staircase pattern and with each block being representative of a numerical designation from "1" to "10";

FIG. 2 is a perspective view of one of the pegs of the present invention utilizable in conjunction with the blocks of FIG. 1;

FIG. 3 is a perspective view of a single block having the numerical designation "5";

FIG. 4 is a sectional view taken along the line 4—4 of FIG. 3; and

FIGS. 5, 6, 7, 8 and 9 are perspective views depicting progressively a series of steps exemplifying the method whereby the blocks and pegs of the present invention may be arranged in a stack to depict certain arithmetic concepts.

DETAILED DESCRIPTION OF THE PREFERRED EMBODIMENT

Referring now in detail to the drawing, the present invention is shown as embodied in a set of blocks, generally designated by the reference character B, and by a set of pegs 12. The blocks B are number blocks and each of them is assigned a specific numerical value designation. In FIG. 1, there is shown a typical set of blocks B arranged in a staircase pattern there, being a block B for each of the numerical value designations "1" through "10." Accordingly, as seen from FIG. 1, the reference character used to identify each specific number block B has been chosen to also represent the numerical value designation assigned to said block, with the set of blocks shown in FIG. 1 being, therefore, represented by the reference characters B-1 through B-10.

It will be apparent from the description which follows that any amount of a specific number block, e.g. B-1, B-2, or B-3, etc., may be included in a teaching aid set constructed according to the present invention. It will also be apparent that the blocks 10 need not be limited to the specific set of numerical value designations assigned to the blocks of the embodiment described herein. Thus, blocks B having numerical value designations in excess of "10" may be provided, as well as blocks having numerical value designations other than the specific values, i.e., "1" through "10" set forth herein.

In order to facilitate a description of the structural character of the blocks B, the block B-5 is depicted in FIGS. 3 and 4 as an exemplary representation of the type of blocks with which the present invention is concerned. As shown in FIGS. 3 and 4, the block B-5 has applied to one side thereof numerical indicia $n$ representing the numeral "5," and is formed with a generally rectangular cross sectional configuration represented by end faces 14 and 16 and shown in FIG. 4. The block B-5 further comprises a top face 18, a front face 20, a bottom face 22, and a rear face 24. The size dimensions and structural configuration of the blocks B are of important significance in their utilization as intended by the present invention.

Specifically, and as shown in FIG. 3, the block B-5 comprises a length dimension extending between the end faces 14 and 16 designated as 5L. In the construction of the blocks B of the present invention, each block will have a length dimension which is determined by the numerical value designation n which is assigned to the block. The length of each block is determined to be proportional to the numerical value designation of the block, and it will be apparent that the block B-1 bearing the numerical value designation "1" will have a length equivalent to a distance designated by the letter L. In the preferred embodiment described herein the length L of the block B-1 is 1½ inches and consequently, the length 5L of the block B-5 is 7½ inches. However, it should be understood that any appropriate value consistent with the overall size of the entire device embodying the present invention could be selected, and it may be that where larger blocks are considered more suitable to enhance the graphicness of the device, a longer distance may be chosen for the value L.

Accordingly, it will be seen that each of the blocks will have a length dimension equal to $nL$, with $n$ being equivalent to the numerical value designation assigned to a specific block B and with L being the length of the block B-1 bearing the numerical value designation "1."

All of the blocks B referred to herein will have a height dimension $h$ extending between the top face 18 and the bottom face 22 which will be generally equivalent for each block. Likewise, the width $w$ of the blocks which may be defined as the distance from the front face 20 to the rear face 24 will be generally equivalent for each block B.

Each of the blocks B is structured to define therethrough a number of apertures 30 which are generally dimensionally equivalent with each comprising a circular configuration having a diameter $d$. The apertures 30 extend from the top face 18 to the bottom face 22 of the blocks B and have a length dimension designated $t$. Each of the blocks B have extending therethrough a number of apertures 30 equivalent to the numerical value designation $n$ assigned to the block, with the apertures being equivalently spaced along the length of the block.

In addition to the number blocks B, the teaching aid set embodying the present invention also includes a plurality of pegs 12 each having a pair of end faces 32 and 34 and structured to comprise a length dimension P extending between the end faces 32 and 34 and a circular cross sectional configuration having a diameter D. As will be apparent from the description which follows, the specific value chosen for the length P of the peg 12 relates to a significant feature of the present invention and will be importantly dependent upon the dimensional value of the height $h$ of blocks B.

Generally stated, the basic approach in the utilization of the embodiment of the present invention involves positioning of a plurality of the nunber blocks B with the pegs 12 extending through the apertures 30, with the parts being relatively positioned to comprise a representation of a numerical fact or arithmetic concept.

For example, and with reference to FIG. 5, in the manipulation of the device of the present invention to represent the various relationships which may exist involving the number "5," the number block B-5 may be first placed with its bottom face 22 upon a flat surface in a position wherein the apertures 30 have their length dimension $t$ extending in a vertical direction. Subsequently, a peg 12 is placed in each of the apertures 30 formed through the block B-5 with the block positioned to have its numerical indicia $n$ facing the child or other user. Since in the case of block B-5 the value of $n$ is "5," there will be five apertures 30 extending through the block and, accordingly, there will be five pegs 12 placed within block B-5. With the arrangement of FIG. 5 completed, the child will see the five pegs 12 extending upwardly from the block B-5 thus providing a physical representation of the number "5" enabling the child to feel and count each of the pegs 12 and to relate this sensory experience with the concept of a numerical value equivalent to "5" which has been previously recognized from the indicia $n$ on the block B-5 and from the five apertures 30 contained therein.

By further manipulation of other parts of the device, arithmetic concepts involving the number "5" may likewise be demonstrated and physically and visually represented. For example, as shown in FIG. 6, the child may then select a block B-3, which represents a numerical value designation equivalent to "3," and place this block on the top of the block B-5 with three of the pegs 12 extending through the apertures 30 in the block B-3. With the blocks arranged in this manner it will be apparent that the two pegs 12 at the right side of the arrangement depicted in FIG. 6 will not extend through the block B-3 and, accordingly, there will be provided a physical representation of the relationship between the value "3" and the value "5" by virtue of the fact that three of the five pegs 12 will be exposed over differing portions of their length. Of course, it will be apparent that since all of the apertures 30 are equivalently spaced along the length of the blocks 10, they will be in alignment, as will be the ends of the blocks, when the blocks are stacked with the pegs 12 extending through the apertures 30.

Furthermore, an additional physical representation of this relationship will be afforded by the fact that the length of the block B-3 will be three-fifths the length of the block B-5, and it will be apparent that by the combined operation of the physical characteristics and juxtaposition of the blocks B-3, B-5 and of the particular pegs 12 extending therethrough, an arithmetic concept representing the relationship between the numerals "3" and "5" will be graphically physically depicted.

FIG. 7 depicts the next manipulative step which may be performed subsequent to the completion of the stack arrangement depicted in FIG. 6. This involves the addition of a third number block B-2 to the stacked arrangement. By the addition of the block B-2 there is completed a physical representation of the equation 3+2=5 with the first or lower level of the stack comprised of block B-5 having a length which is physically equivalent to the length of the second level of the stack comprising blocks B-3 and B-2. Therefore, the stacked arrangement of FIG. 7 will not only be physically representative of the relationships which exist between the numerical values involved, but it will also provide a graphic physical representation of the arithmetic concepts relating to the equivalency of the numbers represented by the two levels of the stack. This will occur not only by operation of the pegs 12 and by their physical juxtaposition relative to the blocks B and to the stack in which they are utilized.

As will be apparent from the drawings in FIGS. 5, 6 and 7, the length P of the pegs 12 which are inserted to extend through the orifices 30 of the blocks B-2, B-3 and B-5 is in each case equivalent to a value greater than twice the height h of the number blocks. Specifically, in the preferred embodiment described and depicted herein, the length P of each of the pegs 12 was chosen to be equivalent to approximately 2 7/10 times the height h of the number blocks B, which is considered to be the preferred relationship for an optimum structural relationship between the parts. The preferred specific dimensions of the preferred embodiment described herein are P equals 2 and 3/16 inches and h equals thirteen-sixteenths of an inch. These are considered the important dimensions of the parts, with the balance of the dimensions being less critical. Thus, for example, the width w of the blocks B and the diameters d and D of the apertures 30 and of the pegs 12, respectively, may be any dimensions appropriately correlated to the dimensions set forth above for t and h. Of course, the diameter D of the pegs 12 must be slightly smaller than the diameter d of the apertures 30 to allow for both easy insertion and removal of the pegs 12 from the apertures 30, and a secure fit therebetween when the parts are assembled to form a stack. In the preferred embodiment described herein the diameter d is eleven-sixteenths of an inch, and the diameter D is five-eights of an inch. The width w is selected to be 1½ inches.

FIG. 8 shows the stack of FIG. 7 with a third level of number blocks applied thereto. With the stack in the condition shown in FIG. 7, the pegs 12 will extend above the top surface of the number blocks B-2 and B-3 for a distance equivalent to approximately seven-tenths of the height h of the number blocks. Accordingly, when an additional block is placed thereover, the upwardly extending portion of the pegs 12 will be available for alignment with the apertures 30 of said added blocks in order to properly align the blocks upon the stack and to provide an added visible indication of the value of the added blocks. For example, in FIG. 8 the block B-4 representing the numerical designation "4" is placed to extend completely over the block B-3 and over half the length of the block B-2. Although only slightly visible in the drawing of FIG. 8, the portion of the length of pegs 12 shown in FIG. 7 as extending for a distance of approximately seven-tenths of the height h above the top of the stack of FIG. 7 will engage the apertures 30 of the block B-4 and extend thereinto for a distance equal to approximately seven-tenths the height of the block B-4. Similarly, an additional number block B-1 may be added to the stack of FIG. 8 with the aperture 30 of the block B-1 fitting over and around the upper portion of the rightmost peg 12 of the stack which will likewise extend thereinto for a distance of approximately seven-tenths of the height h.

Accordingly, it will be apparent that in FIG. 8 there is depicted a three level stack of blocks which provides physical representation of concepts dealing with the numerical value "5" and the arithmetic concepts related to the equation 5=3+2=4+1.

The stack of FIG. 8 may be continued by having a fourth layer added thereto in the manner shown in FIG. 9. This is accomplished by insertion of a second set of five pegs 12 into the apertures 30 of the blocks representing the third level of the stack. Accordingly, by insertion of pegs 12 in each of the apertures 30 of the blocks B-4 and B-1 at the third level of the stack of FIG. 8, there will be developed a stack having five pegs 12 extending from the top of the stack for a length equivalent to approximately 2 4/10 the height h of a number block B. It will be apparent that this will occur since, as previously stated, the first lower set of pegs 12 were of a length which enabled them to extend into the third level of blocks for only approximately seven-tenths of the height h of the number blocks 10.

Subsequent to the addition of the second level of pegs 12, a fourth level of blocks B may be added to the stack of FIG. 8 to form a four level stack of the type depicted in FIG. 9 which shows the addition, at the fourth stack level, of two blocks B-2 and one block B-1. Thus, there is once again added a level of blocks equivalent to the numerical value "5" which provides further physical representation of the numerical value "5" and of the equivalencies related to the sum "5."

It will be apparent to anyone skilled in the art that the stack of FIG. 9 may be continued upwardly beyond the level shown by the addition of more number blocks B and pegs 12. The manner whereby this continuation will be effected is considered to be capable of derivation in an obvious manner based upon the foregoing description.

An important feature of the present invention relates to the particular relationship which is established between lengh P of the pegs 12 and the height h of the blocks B. It will be clear that in order to permit the continuous stacking of a plurality of levels of blocks B with a continuous portion of the peg length extending between levels, the pegs 12 must be of a length unequal to the height h. The maximum stack which can be constructed, by the method hereinbefore described, will be dependent upon the relationship between h and P and will be achieved when the total vertical length of one row or stack of pegs 12 is equivalent to the total height of the stack of number blocks B. For example, in the specific embodiment previously described herein it was stated that the length P of the pegs 12 was approximately 2 7/10 the height h of the number blocks B. Accordingly, it will be apparent to those skilled in the art that the maximum stack height which can be achieved is a stack of 27 levels utilizing in a single columner row a maximum of 10 pegs 12. It will also be apparent that a fixed relationship will exist between the length P of the pegs 12 and the maximum number of levels which can be achieved in a stack utilizing blocks having a height h. This relationship may be developed by reducing to a simple fraction the relationship between the length P of the pegs 12 and the height h of the blocks B. For example, in the preceding embodiment it was stated that $P = 2.7h$. Since the numerical quantity 2.7 is equivalent to the fraction 27/10 it will follow that since $P = 27/10h$, then $10P = 27h$. Thus, a stack having 27 levels of number blocks B and 10 levels of pegs 12 will be equivalent in height and will therefore be the maximum stack which can be constructed with the dimensions ascribed to the various pieces of the preferred embodiment set forth herein.

It is considered within the knowledge of anyone skilled in the art to contrive variations of these dimensions to assemble a set of arithmetic teaching devices in accordance with the present invention which will enable the construction of stacks of various levels. For example, it will be found that by constructing the device of the present invention with a different length $P$ for the pegs 12 and with a different relationship between the length $P$ and the height $h$, various arrangements having different maximum stack levels may be contrived all within the scope and purview of the invention.

It will be found that an important consideration in constructing devices in accordance with the present invention will be to construct the pegs 12 with a length dimension $P$ which is a nonintegral multiple of the height $h$ of the blocks B in order to provide for the ability to construct a multiplicity of stacked levels of blocks B with a continuous portion of the peg length extending between stacked block levels. Of course, it will be apparent that with longer pegs 12 there may be constructed stacks having more levels with a lesser number of pegs. Furthermore, although it would be possible to construct a teaching aid in accordance with the present invention utilizing pegs 12 which comprised a length $P$ less than the height $h$ of a block B, it would not be possible to do so if the length $P$ of the pegs 12 was taken to be a fraction of the height $h$ which was an integral multiple thereof. For example, utilizing pegs 12 having a length $P$ equivalent to one-half the height $h$ of the blocks B it would be impossible to construct a stack having plural levels since two of the pegs 12 would be equivalent to the height $h$ of a stack and the height of the pegs would not, therefore, be capable of extending above and beyond the first level of member blocks B in a manner enabling support and placement of a second level.

Structuring the pegs 12 with a length dimension $P$ of approximately 2 7/10 the height $h$ is considered to be an optimum arrangement since it enables the construction of a stack having an appropriate number of levels without necessitating pegs 12 of cumbersome or undue length. Thus, a complete teaching aid and educational toy may be constructed and packaged for distribution in a convenient size and package.

Of course, it should be understood that the present invention may be utilized in a wide variety of manners, different than the specific manner hereinbefore described, to teach or convey arithmetic concepts. In the foregoing discussion, manipulations involving addition of value equivalent to the numerical value "5" were described. It should be understood that other numerical values may be similarly dealt with. Furthermore, the device may be utilized not only in connection with teaching of addition, but also for teaching other arithmetic processes, including addition, subtraction, multiplication, division and other similar operations.

Accordingly, although the present invention has been described by reference to a specific structural embodiment thereof, it is to be understood that many variations and modifications of the particular structure described may be effected by those skilled in the art without departure from the scope and purview of the invention.

What is claimed is:

1. A manipulative arithmetic device comprising:
   a plurality of blocks each having
   a numerical value designation,
   a height dimension which is equivalent for each of said blocks and which extends transversely of said length dimension, and
   a number of apertures representative of said numerical value designation extending through said blocks across said height dimension and equivalently spaced therealong, said number of apertures being determined by said numerical designation; and
   a plurality of pegs of a generally equivalent length adapted to be removably placed within said representative apertures, said blocks and pegs being adaptable to stacking with said blocks when placed in alignment one upon another forming a plurality of levels wherein said representative apertures become vertically aligned to form a continuous vertical aperture extending through said stack, with said pegs placed therein in a stacked configuration which extends continuously therethrough;
   the length of each of said pegs being of a dimension which bears a particular predetermined ratio to the height of said blocks, said ratio being such that the overall height of said stacked pegs will always be unequal to the overall height of said stack of blocks for all levels of a stack below a predetermined maximum number of stacked block levels.

2. A device according to claim 1 wherein the length of each of said pegs is greater than twice the height of said blocks.

3. A device according to claim 2 wherein the length of said pegs is equivalent to approximately 2 7/10 times the height dimension of said blocks.

4. A device according to claim 3 wherein the length dimension of said pegs is 2 3/16 inches and wherein the height of said blocks is thirteen-sixteenths inches.

* * * * *